(12) United States Patent
Scoggins, Jr. et al.

(10) Patent No.: US 8,279,574 B2
(45) Date of Patent: Oct. 2, 2012

(54) EMERGENCY LIGHTING SYSTEM

(75) Inventors: William O. Scoggins, Jr., Donalds, SC (US); David A. Bradley, Mars, PA (US); Kevin S. Koder, Cumming, GA (US); Jeffrey D. Lord, Suwanee, GA (US); Seshagiri R. Marellapudi, Norcross, GA (US); Michael J. Mennes, Altadena, CA (US); Ronnie H. Ridgeway, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 611 days.

(21) Appl. No.: 12/535,916

(22) Filed: Aug. 5, 2009

(65) Prior Publication Data

US 2010/0109438 A1 May 6, 2010

Related U.S. Application Data

(60) Provisional application No. 61/087,804, filed on Aug. 11, 2008.

(51) Int. Cl.
*H01H 73/00* (2006.01)
(52) U.S. Cl. .................................................. 361/115
(58) Field of Classification Search .................. 361/115
See application file for complete search history.

(56) References Cited

U.S. PATENT DOCUMENTS 4,686,424 A * 8/1987 Nuckolls et al. ................ 315/86

* cited by examiner

*Primary Examiner* — Stephen W Jackson (57) ABSTRACT

An emergency lighting system comprising an electrical panel board comprising a two-pole switched breaker with one pole controlled using an Emergency Remote Operated Relay. Each of the poles of the circuit breaker is fed by a single phase. The controlled pole feeds normal power to the lighting ballast operating under normal conditions. The non-controlled pole feeds constant power to at least one battery which provides back-up power to the light(s) in an emergency/power failed condition. The Emergency Remote Operated Relay further comprises a two pole circuit breaker (BQD 2P) with one of the poles connected to a Remote Operated Relay that is remotely controllable.

20 Claims, 6 Drawing Sheets

EMERGENCY LIGHTING SYSTEM

CROSS-REFERENCE TO RELATED APPLICATIONS

This application claims priority to and the benefit of pending U.S. Provisional Patent Application No. 61/087,804, filed Aug. 11, 2008, entitled "Emergency Lighting System," the entire disclosure of which provisional application is hereby incorporated by reference.

This application claims priority to and the benefit of pending U.S. patent application Ser. No. 11/635,358, filed Dec. 7, 2006, Publication No. 2008/0084114, entitled "System Controller For Integrated Lighting Control Panels," the entire disclosure of which pending application is hereby incorporated by reference.

The present invention may operate within the control system described in the pending U.S. Patent Application Publication US 2008/0084114 or may be used in other emergency lighting systems. For purposes of discussion only and not by way of limitation, the system disclosed in the above referenced publication will be used as the control system.

TECHNICAL FIELD

The present invention relates generally to an emergency lighting system.

BACKGROUND ART

There has been an increasing demand for remotely controllable circuit breakers that can reciprocate between an open circuit and a closed circuit in response to a remotely generated command. One advantageous application for such circuit breakers is in the control panel boards that are used for automated control systems such as automated lighting systems. Automated lighting systems have been developed for the control of lighting circuits based upon inputs such as the time-of-day, wall switches, occupancy sensors and/or control from a power distribution system. Lighting control systems offer an opportunity to save energy by automating the process reducing the number of lighting fixtures that are illuminated, or by ceasing artificial lighting altogether when circumstances warrant. For example, ambient light sensors can be used to control lighting circuits in response to ambient light levels. The sensors can serve both switching and automatic dimming functions that can adjust the output of the lighting system continuously in response to the amount of daylight striking the ambient light sensor. Occupancy sensors can be used to activate lighting when someone is in a space and to deactivate the lighting, perhaps after a set time interval, when a person is no longer detected in the space. Using such a system, occupants no longer have to remember to turn the lights off when leaving the space. Automated control systems may require a remotely controllable circuit breaker, or relay. It is desirable that such circuit breakers have a low cost and high reliability.

Standard three-phase electric panel boards are offered in various sizes, the most common of which, but not limited to, are 18 circuits, 30 circuits, and 42 circuits. These standard electric panel boards typically have a phase layout in the order of A-Phase, B-Phase, C-Phase, A-Phase, B-Phase, C-Phase, etc. The order of the phase layout starts from the top continues to the bottom, starting from A-Phase and ending at C-Phase. An example of a normal phase layout for a panel having 18 circuits is: A, B, C, A, B, C, A, B, C.

All electrical lighting must comply with the National Electric Codes (NEC). For example, the provisions of NEC Section 700, apply to electrical safety of the installation, operation and maintenance of emergency systems consisting of circuits and equipment intended to supply, distribute, and control electricity for illumination or power, or both, to required facilities when the normal electrical supply or system is interrupted. NEC code Section 700.12 specifically applies to emergency lighting. NEC code Section 700.12 states that the current supply of electricity shall be such that, in the event of failure of the normal supply of electricity to or within the structure concerned, emergency lighting, emergency power, or both shall be available within the time required for the application but not to exceed a time delay of 10 seconds. NEC code Section 700.12 further states that in a separate and uninterrupted area supplied by a minimum of three normal lighting circuits, a separate branch circuit for unit equipment shall be permitted if it originates from the same panel board as that of the normal lighting circuits and is provided with a lock-on feature.

Circuit breaker panels are also used to protect electrical circuitry from damage due to an over-current condition, such as an overload, a relatively high level short circuit, or a ground fault condition. In order to perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle. In the over-current condition, all the pairs of separable contacts are disengaged or tripped, opening the electrical circuitry. When the over-current condition is no longer present, the circuit breaker can be reset such that all the pairs of separable contacts are engaged, closing the electrical circuitry. In addition to manual over-current protection via the operating handle, automatic over-current protection is also provided via the trip unit. The trip unit, coupled to the switch unit, senses the electrical circuitry for the over-current condition and automatically trips the circuit breaker. When the over-current condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

The general terms "switchgear and switchboard" are used to refer to electrical equipment including metal enclosures that house switching and interrupting or protection devices such as fuses, circuit breakers and relays, along with associated control, instrumentation and metering devices. The enclosures typically include devices such as bus bars, inner connections and supporting structures (generally referred to herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein. In addition to electrical distribution and the protection of circuitry from over-current conditions, components have been added to panels for the control of electrical power supplied to loads connected to circuit breakers. For example, components have been used to control electrical power for lighting. One system used for controlling electrical power to loads utilizes a remote-operated circuit breaker system. In such a system, the switch unit of the circuit breaker operates not only in response to an over-current condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel. Operation of remote operated circuit breakers requires a means to receive command signals to open or close, report back successful operation or device status, and drive opening and closing of switch mechanism contacts. In order to meet these requirements most efficiently, electronic circuitry is required. Typically, this circuitry is external to the switching device, due to component size and amount of power required. Locating communication and driver circuitry outside the switching device necessitates that the circuitry always be present in the panel board even if the switching device is not.

U.S. Pat. No. 6,034,581 (DiMarco, et al.), the entire disclosure of which is incorporated herein by reference, discloses a contact assembly 22 which is adapted for use with a circuit breaker 12 that is set to open a circuit above a predetermined current load. The contact assembly 22 is adapted to reciprocate between a closed position to permit the flow of current through the circuit and an open position to prevent the flow of current. The contact assembly 22 is further adapted to resist unintended reciprocation from the closed position to the open position at current loads up to or exceeding the predetermined current load. The contact assembly includes a line side conductor 38 and a load side conductor 54. When in the closed position, a surface 42 of the line side conductor 38 extends proximal to a surface 56 of the load side conductor 54 and current flows in substantially the same direction along the line side and load side surfaces 42 and 56 to generate an electromagnetic attraction between the conductors 38 and 54 in order to resist unintended reciprocation of the contact assembly 22 from the closed position to the open position due to inherent repulsion forces present across the contact points (contact constriction forces). U.S. Pat. No. 6,034,581 also describes a circuit breaker assembly 10 and an automated control system 300.

U.S. Patent Publication No. 20080084644 (William A. King), the entire disclosure of which is incorporated herein by reference, discloses an electrical distribution system for selectively connecting an electrical power source to load devices comprising a panel board having a plurality of load circuit positions. A remote operated device is mountable in the panel board comprising a load control device, and a device control for controlling the load control device. The device control comprises a programmed controller for operating the load control device responsive to control commands and a communication circuit for receiving control commands. An input/output (I/O) controller is mounted in the panel board for controlling operation of the remote operated device. The I/O controller comprises a programmed controller for generating the control commands for commanding operation of the remote operated device. The control system includes a communication circuit for communication with the remote operated device communication circuit.

There are commercially available emergency light fixtures that combine normal lighting and emergency lighting in one fixture. These light fixtures require two separate AC power inputs from the electrical panel board. A first AC input is for the normal lighting, which may require a remotely controlled circuit breaker or relay. A second AC input is for the emergency lighting. This second AC input provides power for charging the internal battery located in the fixture, and for powering the fixture's internal control circuits that sense loss of power from the electrical panel board and activate the emergency lighting circuits powered by the internal battery.

What is needed is an emergency lighting system that overcomes the aforesaid problems of the prior art.

DISCLOSURE OF THE INVENTION

One purpose of the present invention is to provide an electrical power distribution panel that overcomes the problems and deficiencies of the prior art electrical power distribution panels.

Another purpose of the present invention is to provide a low cost and high reliability remotely controllable circuit breaker.

A further purpose of the present invention is to provide a remotely operated device that includes internal intelligence in an electrical power distribution system.

A further purpose of the present invention is to accomplishing an Emergency Lighting System with phase layout change in the standard electrical panel board. The phase layout change provides flexibility for various user configurations A further purpose of the present invention is to accomplishing an Emergency Lighting System Use of a 2-pole circuit breaker on the same phase, with one of the pole connected to a remotely-operated-relay.

One feature of the present invention is that it can be configured for use with an automated control system.

Thus, the present invention is directed, in one aspect, to an emergency lighting system, comprising:
a circuit breaker operatively connected to a primary power;
an emergency lighting control circuit electrically connected to the circuit breaker, the emergency lighting control circuit comprising:
an AC ballast for operation of lighting, the AC ballast electrically connected to a control pole of the circuit breaker;
an emergency ballast electrically connected to a non-control pole of the circuit breaker;
at least one lamp operatively connected to a back-up power source of the emergency ballast;
wherein, if power is lost, then the at least one emergency lamp is powered from the backup power source of the emergency ballast.

In another aspect, the present invention is directed to an emergency lighting system, comprising:
a circuit breaker;
an electrical panel board connecting the circuit breaker to the primary power source an emergency lighting control circuit electrically connected the circuit breaker, the emergency lighting control circuit comprising:
an AC ballast for operation of lighting, the AC ballast electrically connected to a control pole of the circuit breaker;

an emergency ballast electrically connected to a non-control pole of the circuit breaker; at least one lamp operatively connected to a back-up power source of the emergency ballast;

wherein, if power is lost, the at least one emergency lamp is powered from the backup power source of the emergency ballast; and wherein the electrical panel board comprises:

a phase layout comprising a plurality of consecutively arranged phases comprising at least one pair of consecutive phases that are of a first phase, a 2-pole branch circuit breaker electrically connected to the pair of consecutive phases that are of the first phase, and a 1-pole remotely-operated-relay electrically connected to one pole of the 2-pole branch circuit breaker.

In another aspect, the present invention is directed to a method of operating an emergency lighting system, the method comprising:

providing power to an emergency lighting control circuit of the emergency lighting system wherein a circuit breaker operatively connected to a primary power supply and the emergency lighting control circuit;

providing power via a control line from the circuit breaker to an AC ballast of the emergency lighting control circuit;

providing power via a non-control line from the circuit breaker to an emergency ballast of the emergency lighting control circuit;

determining whether power is present on the non-control line from the circuit breaker to emergency lighting control circuit;

providing power to at least one emergency lamp from a back-up power source of the emergency ballast if power is not present on the non-control line from the circuit breaker to the emergency lighting control circuit.

Advantages, features and other purposes of the present invention are described in the ensuing description.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

BEST MODE FOR CARRYING OUT THE INVENTION

Figure 1:
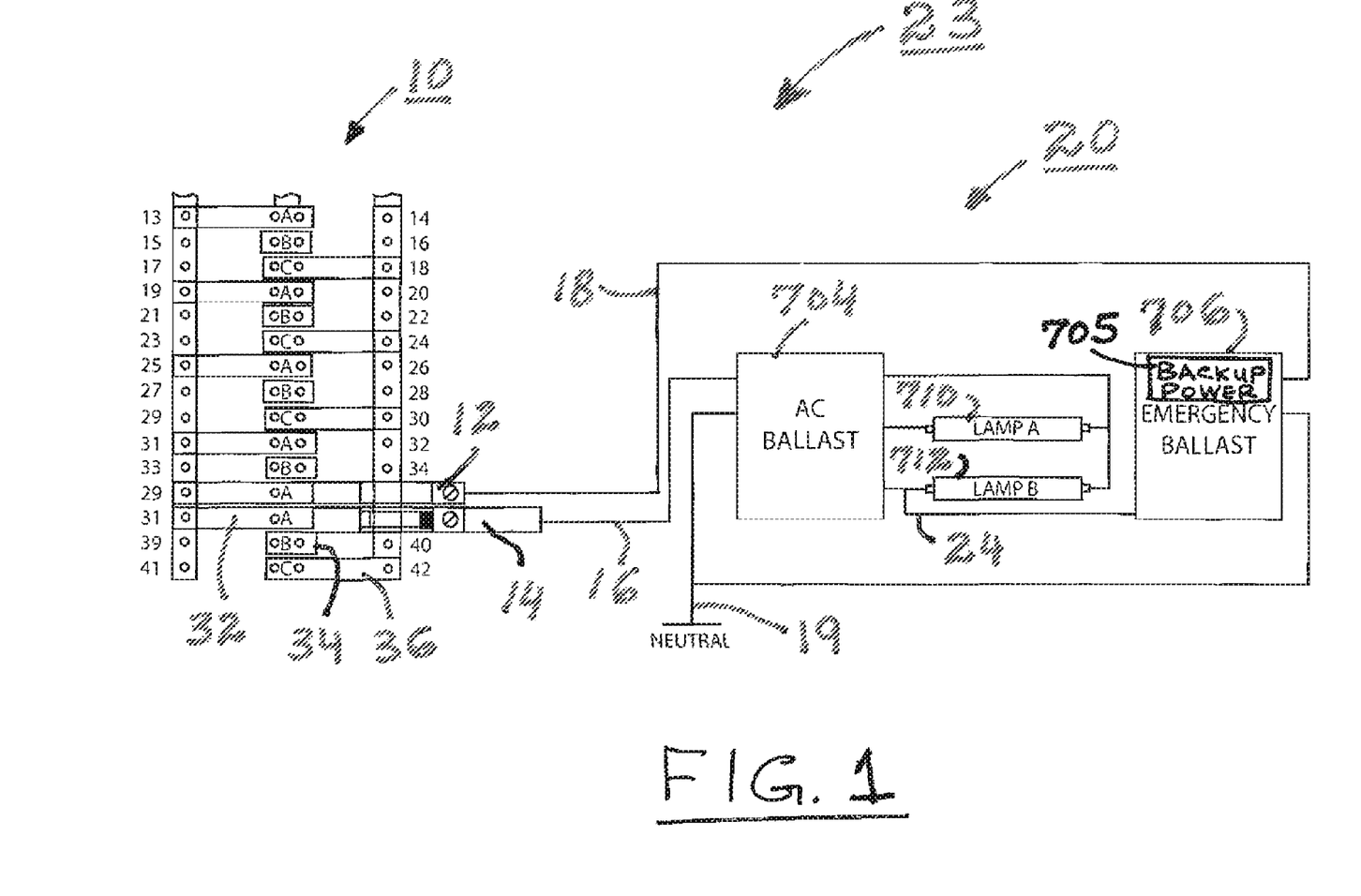
FIG. 1 is a block diagram of an emergency lighting system including an emergency light control circuit in accordance with one embodiment of the invention.

An embodiment of the emergency lighting system 23 of the present invention, as illustrated in FIG. 1, comprises a two-pole switched breaker with one pole controlled using an Emergency Remote Operated Relay 14 Each of the poles of the circuit breaker is fed by a single phase to meet NEC requirements for use with emergency lighting ballast(s) 706. An emergency lighting control circuit 20 is connected to circuit breaker 12. The emergency lighting control circuit 20 comprises an AC (Alternating Current) ballast 704, an emergency ballast 706, a battery (not shown) and lamp-A 710 and lamp-B 712. The controlled pole or controlled line 16, from remotely-operated-relay 14, to emergency lighting control circuit 20, feeds normal power to the lighting ballast 704, operating under normal conditions. The non-controlled line 18 feeds constant power to an emergency ballast 706 which provides back-up power to the light(s) in an emergency/power failure condition.

The emergency ballast includes an emergency battery 705 to supply back-up power; one of ordinary skill in the art would understand that other ballast configurations, such as, for example, a ballast with internal capacitance could be used to provide back-up power. In the present embodiment, lamp-B 712 serves as emergency lighting, however one of ordinary skill in the art would understand that one or more lamps can serve as emergency lighting. The configuration of emergency lighting can be determined by one of ordinary skill in the art considering factors, such as, for example, the amount of back-up power needed for lamps designated as emergency lamps. In the emergency light control circuit 20 of the present invention, the back-up power or emergency power is supplied by the battery 705. The battery 705 can be integral to the ballast 706 or electrically connected thereto. Also, the ballasts are electronic, however other types of ballasts may be used as determined by one of ordinary skill in the art.

Regarding the ballasts 704, 706 of emergency lighting control circuit 20 a typical electrical ballast is a device intended to limit the amount of current in an electric circuit. Ballasts vary greatly in complexity. The Ballast can be a series resistor as commonly used with small neon lamps or light-emitting diodes (LEDs). In higher-power installations, to conserve energy an alternative to a resistive ballast is typically used, i.e. the alternatives depend upon the reactance of inductors, capacitors, or both. Furthermore, ballasts can be complex i.e. computerized, remote-controlled electronic ballasts. Such complex ballasts are often used with fluorescent lamps.

An embodiment of the emergency lighting system 23 of the present invention, illustrated in FIG. 1 comprises the emergency lighting control circuit 20, an Emergency Remote Operated Relay 14 electrically connected to a two pole circuit breaker 12 (for example, a commercially available SIEMENS/ITE BQD CIRCUIT BREAKER BQD220 2P manufactured by Siemens Energy & Automation, Inc. of Alpharetta, Ga.) with one of the poles connected to a Remote Operated Relay 14 that is remotely controllable as previously disclosed in the above referenced patent publication US 2008/0084114. Each of the two pole breakers may be illustrated as a single circuit breaker 12, herein for simplicity of description.

Shown in FIG. 1 is an emergency lighting system 23. More specifically, FIG. 1 shows a panel board 10 with A-Phase, B-Phase, C-Phase phase bus bars 32, 34 and 36 respectively. FIG. 1 illustrates only single circuit breaker 12 for simplicity of illustration, however one of ordinary skill in the art would understand that more than one circuit breaker (each connected to a remotely-operated-relay 14) can be included in the bus configuration and/or panel board 10. Typically each emergency remotely operated relay 14 (also known commercially as Emergency Lighting Control Solution (EPod)) is mounted in a horizontal pair as is illustrated for example as phase AA configuration of FIG. 1. The exemplary strap or connector 701 (illustrated in FIG. 2) configurations of this embodiment of the present invention are AA. The connection of breaker 12 is electrically connected to remotely-operated-relay 14 which is connected to emergency lighting control circuit 20 comprising a controlled pole or controlled line 16 from the circuit breaker 12 to the AC ballast and a non-controlled pole or non-controlled line 18 to emergency ballast 706.

Figure 2:
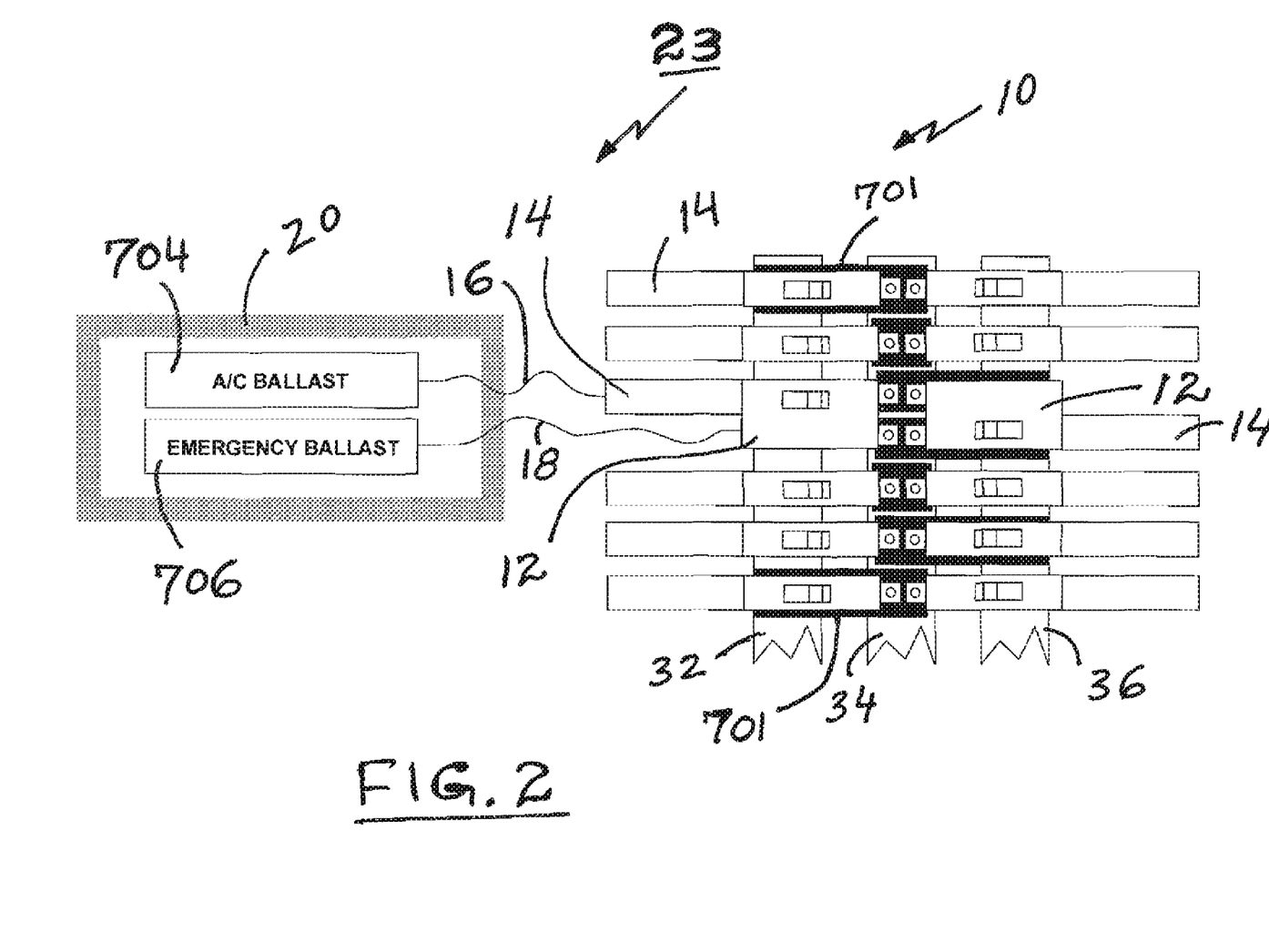
FIG. 2 illustrates a exemplary simplified connection for an emergency light control circuit of the emergency lighting system of FIG. 1.

Referring to FIG. 1, in an embodiment of the invention, a commercially available standard lighting panel board 10 such as, for example, a NEMA (National Electrical Manufacturers Association) Type 1 panel board 10 is illustrated with two emergency circuits; each emergency circuit comprises a circuit breaker 12 electrically connected to a remotely-operated-relay 14 In the present embodiment the 2 pole circuit breaker 12 and the Emergency Remote Operated Relay 14 are fed from source/bus-A. Source/bus configurations are not fully illustrated in FIG. 2 in order to simplify the illustration of the electrical connection. FIG. 2 is further simplified by illustrating only 1 of 2 breakers in order to show bussing configuration One of ordinary skill in the art would understand that additional circuits fed from alternate buses may be included in the invention (as are illustrated in FIG. 3A-5F) but, for the sake of simplicity, are not illustrated. For example, the single emergency circuit fed from source/bus A installed to the left of circuit breaker 12 are not illustrated in conjunction with the source/bus C configuration of FIG. 2 (which if illustrated, FIG. 2 would have two emergency circuits): These emergency circuits fed from source/busA, for purposes of description/illustration) do not include a circuit breaker; the omission of the circuit breaker allows for simplified disclosure of source/bus A configuration. The pole connected to the Emergency Remote Operated Relay (ROR) 14 is connected to the AC ballast 704 that operates both lamp-A 710 and lamp-B 712 (FIG. 1). Lamps of the present embodiment are fluorescent however other lighting types as may be determined by one of ordinary skill in the art can be used. However, the other pole is connected to the emergency battery/emergency ballast 706 Note should be taken that in FIG. 2 the 2 pole circuit breaker 12 is connected to the same source of power (phase A bus bar 32).

Under normal operating conditions, both lamp-A 710 and lamp-B 712 may be turned on and off while power is fed to the emergency battery/emergency ballast 706. In the event that power is lost on feeder busA, the emergency ballast senses the power loss and allows for power (emergency battery/emergency ballast 706) to be provided to lamp-B 712 only. The powering of lamp-B 712 only is for illustrational simplicity; more than one lamp may be powered as many be determined by one of ordinary skill in the art.

Under typical operating conditions, lamps (i.e. lamp-A 710 and lamp-B 712 may be turned on and off while power may be fed to the emergency battery 705. In the event that power is lost on a bus (i.e. non control pole 18 loses power) feeding the emergency lighting control circuit 20, the emergency ballast 706 senses the power loss and allows for back-up power (i.e. emergency battery) to be provided to at least one emergency lamp (i.e. lamp-B 712).

Figure 1A:
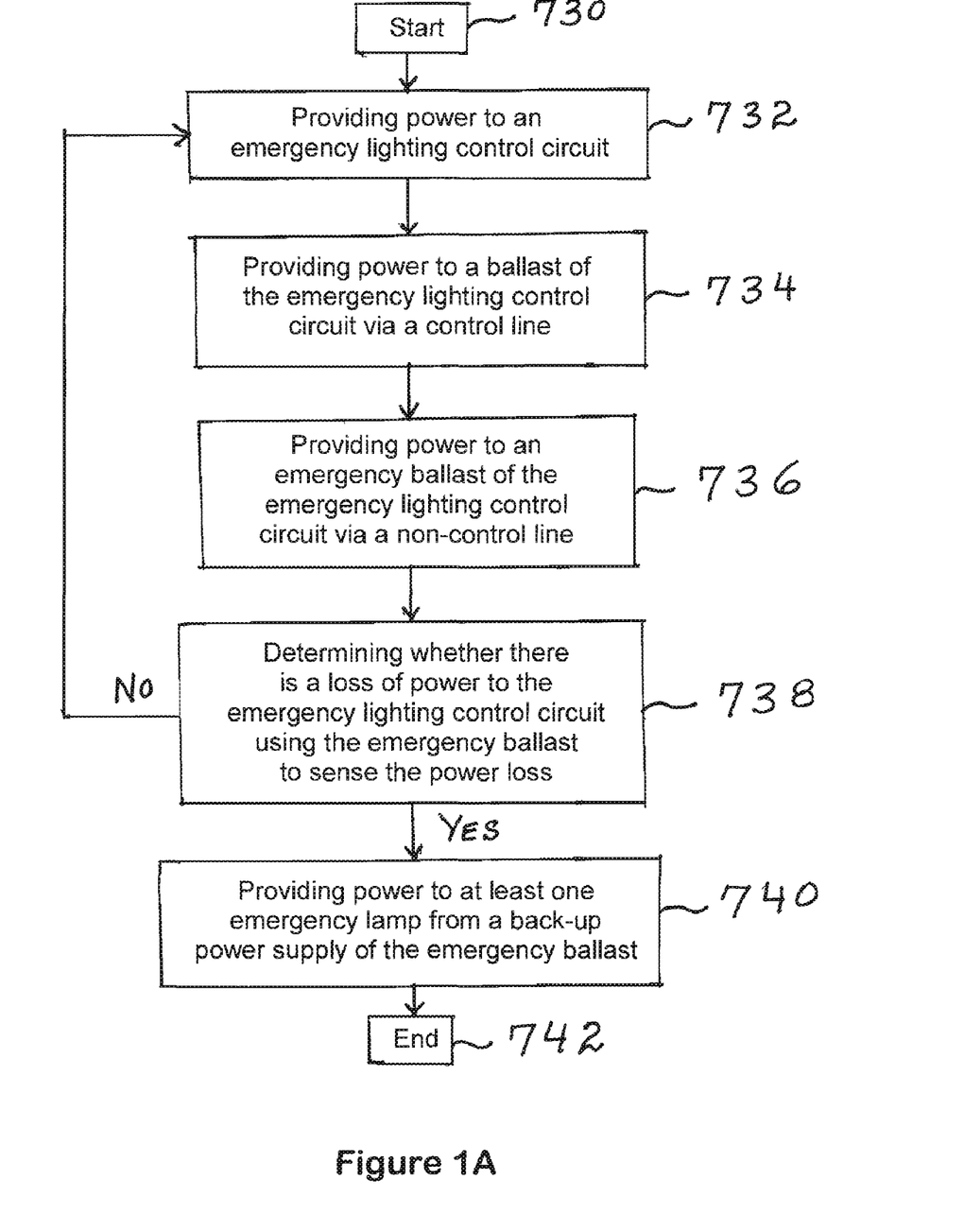
FIG. 1A is a flowchart illustrating an embodiment of a method of operating an emergency light control circuit of the emergency light system of FIG. 1.

FIG. 1A is a flowchart illustrating an embodiment of a method of operating an emergency light control circuit of the emergency light system of FIG. 1. At 730 the method begins. At 732, power is provided to the emergency lighting control circuit 20. At 734, power is provided via control line 16 to AC ballast 704 of emergency lighting control circuit 20. At 736 power is provided via noncontrol line 18 to emergency ballast 706 of emergency lighting control circuit 20. At 738 a determination is made as to whether the emergency lighting control circuit 20 has lost power; the loss of power is determined using the emergency ballast to sense power loss. If at 738 the determination is made that power has not been lost, the method continues by repeating 732 through 738. If at 738 the determination is made that power has been lost to the emergency ballast then at 740 power is provided to at least one emergency lamp from a back-up power supply of the emergency ballast.

FIG. 1 is an embodiment of the present invention. FIG. 2 illustrates yet another embodiment of the present invention. FIG. 2 illustrates a typical simplified connection for an emergency lighting component using the emergency lighting system of FIG. 1. Furthermore FIGS. 3A-B, 4A-D, 5A-F provide other configurations of electric panel boards that may be used in alternate embodiments of the present invention or aspects of the present invention.

Figure 3A:
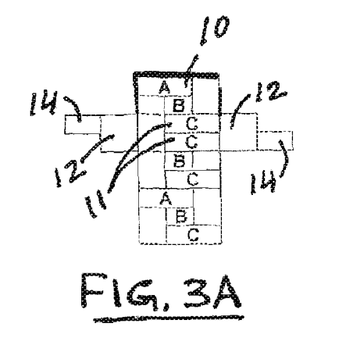
FIG. 3A is a block diagram of the electrical panel board shown in FIG. 1, the electrical panel board having two emergency circuits with a total of eighteen circuits overall.
Figure 3B:
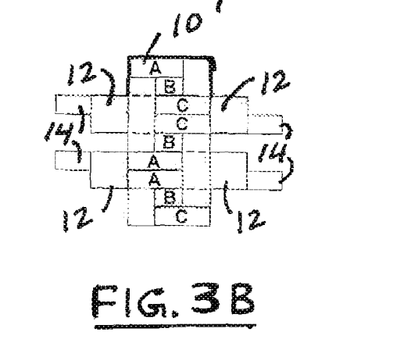
FIG. 3B is a block diagram of an alternate electrical panel board which can be used in the emergency lighting system shown in FIG. 1, the alternate electrical panel board having four emergency circuits with a total of eighteen circuits overall.

FIG. 3B illustrates an exemplary electrical panel board 10, for purposes of illustration only, electrical panel board 10 is shown having 18 circuits. FIG. 3B shows alternate electrical panel board 10' that can be used in place of electrical panel board 10 in emergency lighting system 23. Electrical panel board 10' has four emergency circuits, with a total of eighteen circuits overall.

As described in the foregoing description, commercially available electrical panel boards typically have a phase layout in the order of A-Phase, B-Phase, C-Phase, A-Phase, B-Phase, C-Phase, . . . etc. starting from the top to the bottom, and starting from A-Phase and ending at C-Phase. An example for the normal phase layout for an eighteen circuit panel would be A, B, C, A, B, C, A, B, C. However, in accordance with the invention, electrical panel board 10 is configured so that any two phases are consecutive, phases A-A. For example, as shown in FIG. 1, the phase change layout is A, B, C, A, B, C, A, B, C, A, B, A, A, B, C and in this case, two "A" phases 32 i.e. two A-phase 32, consecutively.

In accordance with the invention, a 2-pole branch BQD circuit breaker 12 is connected to the two consecutive phases that have the same phase. Thus, the aforesaid 2-pole branch circuit breaker can be connected to the same phases such as A-A, B-B, or C-C. As shown in FIG. 1, 2-pole branch BQD circuit breaker 12 is connected to the A-A phase combination. In FIG. 2, a second 2 pole branch BDQ circuit breaker 12 connected to C-C phases is also illustrated.

Returning to FIG. 1, a 1-pole remotely-operated-relay (ROR) 20 is electrically connected to one pole of the 2-pole BQD circuit breaker 12. Remotely-operated-relays, or "ROR" (also specifically referred to herein as "Emergency Remote Operated Relay"), are known in the art and used in i-3 Control Technology, also known as ILC (Integrated Lighting Control). A remotely-operated-relay allows remote switching of an electrical branch load and is configured to fit inside a standard electrical panel board (i.e. NEMA type 1 described above) with up to, but not limited to forty-two branch circuit breakers. A remotely-operated-relay also functions as an accessory to a branch circuit breaker allowing repetitive switching of the load without affecting operation of the circuit protection device. Commercially available remotely-operated-relay devices are available in various configurations, including for example, a 1-pole, and a 2-pole configuration.

Referring again to FIGS. 1 and 2, in order to provide normal as well as emergency lighting, controlled pole or controlled line 16 is electrically connected between the 1-pole remotely-operated-relay 14 and normal lighting input or inverter (not shown) of emergency lighting fixture or ballast 706, and non-controlled pole or non-controlled line 18 is electrically connected between the 2-pole BQD circuit breaker 12 and the internal battery or emergency input 24 of emergency lighting fixture 712 i.e. lamp-B of FIG. 1. Emergency lighting fixture 712 is wired in such a way that controlled line wire 16 is connected to the load side of the 1-pole remotely-operated-relay 14, and non-controlled line wire 18 is connected to the load side of the 2-pole BQD 12. The 2-pole BQD circuit breaker 12 is then connected to the two consecutive phases that are of the same phase 30 (e.g. A phase-A phase as in FIGS. 1 and 2). Note that the aforementioned inverter (not shown) is integral to emergency ballast 706 in the present embodiment of the invention.

Referring to FIG. 2, there is shown a simplified electrical connection of the emergency light control circuit 20 including emergency remotely-operated-relay 14 an electrical panel board 10. Controlled line wire 16 connects AC ballast 704 of emergency light control circuit 20 and non-controlled line wire 18 connects one pole of 2-pole BQD circuit breaker 12 to emergency ballast 706. 712. For purposes of simplifying the diagram, neutral wire 19 is not shown. However, neutral wire 19 of the emergency light control circuit 20 is illustrated in FIG. 1.

Electrical panel board 10 may be modified to have different numbers of emergency circuits and overall circuits. Such embodiments are shown in FIGS. 3A, 3B, 4A, 4B, 4C, 4D, 5A, 5B, 5C, 5D, 5E and 5F.

Figure 4A:
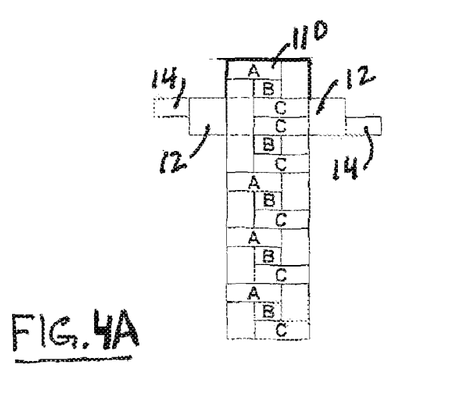
FIG. 4A is a block diagram of an electrical panel board in accordance with another embodiment of the invention, the electrical panel board having two emergency circuits with a total of thirty circuits overall.
Figure 4B:
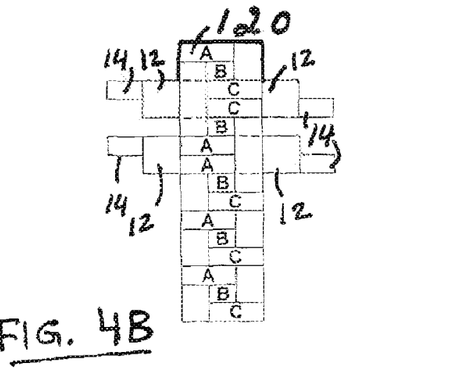
FIG. 4B is a block diagram of an electrical panel board in accordance with a further embodiment of the invention, the electrical panel board having four emergency circuits with a total of thirty circuits overall.
Figure 4C:
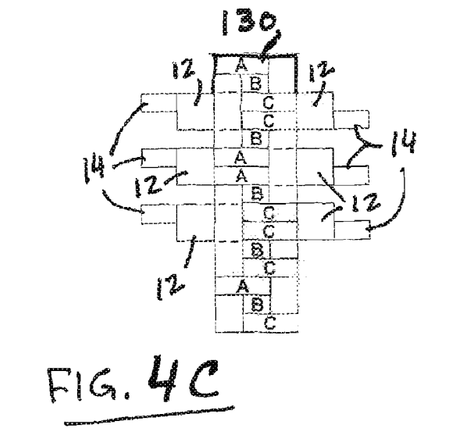
FIG. 4C is a block diagram of an electrical panel board in accordance with a further embodiment of the invention, the electrical panel board having six emergency circuits with a total of thirty circuits overall.
Figure 4D:
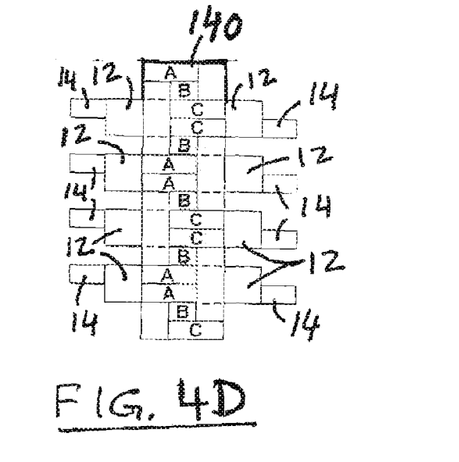
FIG. 4D is a block diagram of an electrical panel board in accordance with a further embodiment of the invention, the electrical panel board having eight emergency circuits with a total of thirty circuits overall.

FIG. 4A is a block diagram of alternate electrical panel board 110 which is configured to have two emergency circuits and total of thirty circuits overall. FIG. 4B is a block diagram of alternate electrical panel board 120 which has four emergency circuits and a total of thirty circuits overall. FIG. 4C is a block diagram of an electrical panel board 130 in accordance with a further embodiment of the invention. In this embodiment, electrical panel board 130 has six emergency circuits with a total of thirty circuits overall. FIG. 4D is a block diagram of an electrical panel board 140 in accordance with another embodiment of the invention. Electrical panel board 140 has eight emergency circuits with a total of thirty circuits overall.

Figures 5A, 5B:
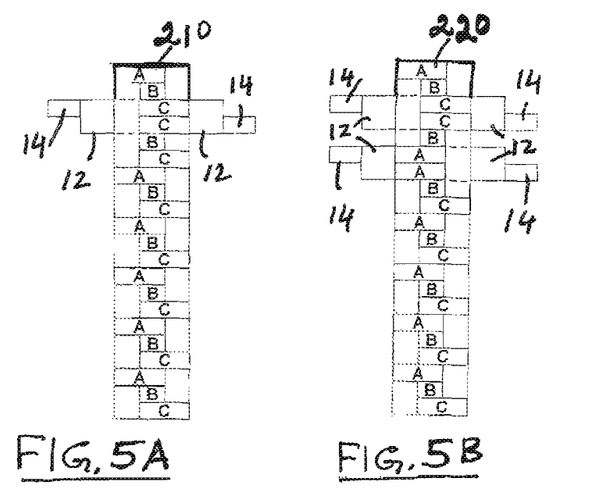
FIG. 5A is a block diagram of an electrical panel board in accordance with yet another embodiment of the invention.
FIG. 5B is a block diagram of an electrical panel board in accordance with a further embodiment of the invention.
Figure 5C:
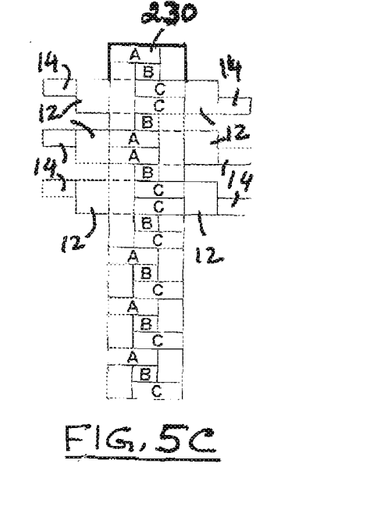
FIG. 5C is a block diagram of an electrical panel board in accordance with yet another embodiment of the invention.
Figure 5D:
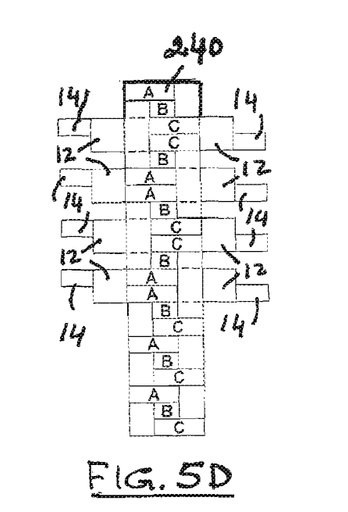
FIG. 5D is a block diagram of an electrical panel board in accordance with still another embodiment of the invention.
Figure 5E:
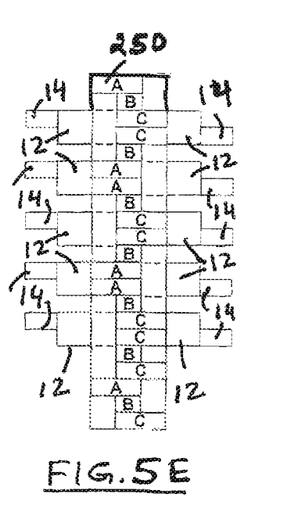
FIG. 5E is a block diagram of an electrical panel board in accordance with a further embodiment of the invention.
Figure 5F:
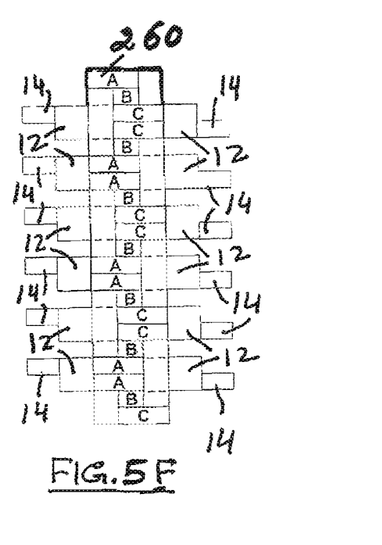
FIG. 5F is a block diagram of an electrical panel board in accordance with yet another embodiment of the invention.

FIG. 5A is a block diagram of alternate electrical panel board 210 which has two emergency circuits and a total of forty two circuits overall. FIG. 5B is a block diagram of alternate electrical panel board 220 which has four emergency circuits and a total of forty two circuits overall. FIG. 5C is a block diagram of alternate electrical panel board 230 which has six emergency circuits and a total of forty two circuits overall. FIG. 5D is a block diagram of alternate electrical panel board 240 which has eight emergency circuits and a total of forty two circuits overall. FIG. 5E is a block diagram of alternate electrical panel board 250 which has ten emergency circuits and a total of forty two circuits overall. FIG. 5F is a block diagram of alternate electrical panel board 260 which has twelve emergency circuits and a total of forty two circuits overall.

In an alternate embodiment, electrical panel board 10 is configured to use a remotely controlled circuit breaker in combination with an automated control device. Such an automated control system and remotely controlled circuit breaker are described in the aforesaid U.S. Pat. No. 6,034,581, the entire disclosure of which patent is hereby incorporated by reference.

Electrical panel board 10 may be used with any one of a variety of load devices, e.g. a relay, a circuit breaker, a current meter, a dimmer, and a magnetically held solenoid. If the load device comprises a magnetically held solenoid, then a sensing device can be used for sensing the position of the magnetically held solenoid. A status indicator device (not shown) may also be electrically connected to electrical panel board 10. In yet a further embodiment, electrical panel board 10 is connected to a programmed controller that comprises at least one microcontroller and associated memory. A suitable load device and programmed controller are described in the aforesaid U.S. Patent Application Publication Number 20080084644, the entire disclosure of which publication is hereby incorporated by reference.

The emergency lighting system of the present invention may include an emergency remotely-operated-relay to provide emergency lighting during a power outage. As stated in the foregoing description, an electrical distribution system, such as an integrated lighting control system in accordance with the invention, allows a user to control power circuits used for lighting, as well as circuits for resistive heating or air conditioning, with a remote operated device including internal intelligence. The lighting control system may include on/off switching, dimming and metering. The electrical distribution system may be as generally described in United States Patent Application Publication No 20070064360 (John DeBoer, et al.), filed Sep. 12, 2006, the entire disclosure of which is hereby incorporated by reference.

Figure 6:
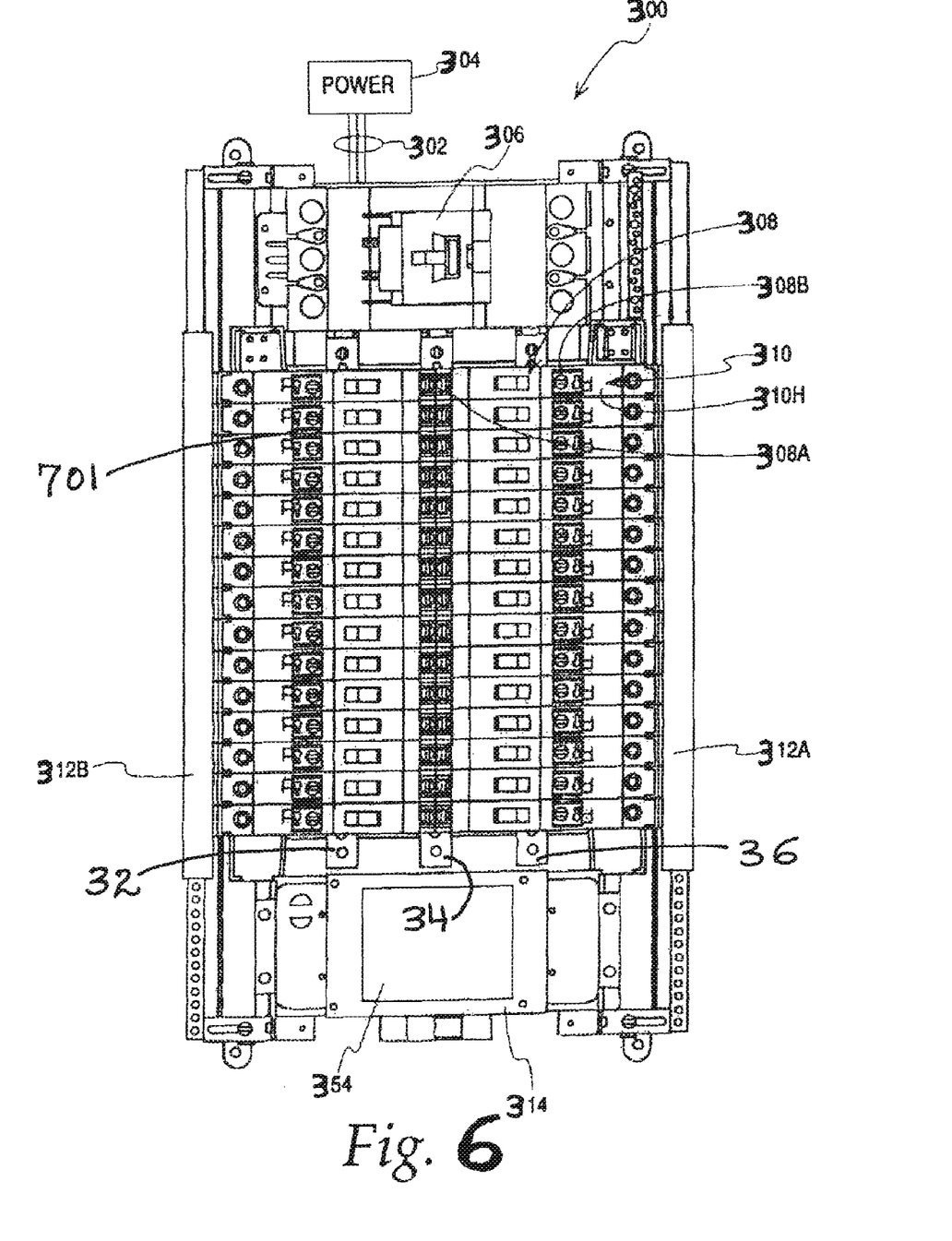
FIG. 6 is an elevation view of a power distribution panel according to the invention.

Referring now to FIG. 6, a lighting control system in accordance with one aspect of the invention comprises lighting control panel 300. In one embodiment, panel 300 comprises for example, a Siemens type P1 panel board, such as a NEMA (National Electrical Manufacturers Association) Type 1 panel board. However, it is to be understood that the Siemens type P1 panel board is just one example and that other suitable panel boards may be used. Line power enters panel 300 through power source cables 302 connected to a source of power 304. Line power may, for example, be a conventional three phase 480Y277, 240 or 120 VAC power source. Power source cables 302 are electrically connected to an input side of a main breaker 306. Main breaker 306 distributes line power to individual circuit breakers 308 in a conventional manner. How the power is distributed depends on design of the individual circuit breakers 308, as will be apparent to those skilled in the art. The power is distributed to the line side of individual circuit breakers 308. Panel 300 may be configured to accept up to, but not limited to, forty-two individual circuit breakers 308, although only thirty are shown in the embodiment of FIG. 6. Each circuit breaker may be of conventional construction and may be, for example, a Siemens BQD circuit breaker. Each circuit breaker 308 includes a line terminal 308A receiving power from the main breaker 306 and a load terminal 308B conventionally used for connecting to a load circuit.

In accordance with the invention, each load circuit to be controlled also has a remote operated device 310, such as a relay, a meter or a dimmer. The term "remote operated device" as used herein includes any other devices that controls, monitors or may otherwise be used in a load circuit, in accordance with the invention. While in a preferred embodiment, the remote operated device 310 is a separate component from the circuit breaker 308, the term "remote operated device" as used herein encompasses devices integral with the circuit breaker. The remote operated devices 310 are also connected to data rails 312A and 312B. Remote operated device 310 includes housing 310H that encases an auxiliary set of contacts that can be remotely operated to open and close a lighting circuit. Remote operated device 310 is attached to the load side of a circuit breaker 308 within panel 300 using a strap 701 (also known as a conductor tab or connector), i.e., a terminal inserted into the breaker lug. Load terminal 308B comprises a lug of the same size as the breaker lug for connecting to a wire to be connected to the load device. Housing 310H is configured to be mounted in a Siemens type P1 panel board, although the invention is not limited to such a configuration. Control panel 300 includes panel controller 314, and a user interface 354. Panel controller 314 controls remote operated devices 310 through connections provided via data rails 312A and 312B. Panel controller 314 further comprises an input/output (I/O) controller and optionally a system controller.

As stated earlier that one purpose of the present invention is to accomplishing an Emergency Lighting System with phase layout change in the standard electrical panel board. This phase layout change is important to the invention, because by creating an emergency circuit breaker without phase layout change would cost a substantial amount of money. The flexibility of the provides that the system can be used with various phase configurations such as, for example, the configurations of FIGS. 3A, 3B, 4A, 4B, 4C, 4D, 5A, 5B, 5C, 5D, 5E and 5F.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An emergency lighting system, comprising:
    a circuit breaker operatively connected to a primary power;
    an emergency lighting control circuit electrically connected to the circuit breaker, the emergency lighting control circuit comprising:
        an AC ballast for operation of lighting, the AC ballast electrically connected to a control pole of the circuit breaker;
        an emergency ballast electrically connected to a noncontrol pole of the circuit breaker;
        at least one lamp operatively connected to a back-up power source of the emergency ballast;
    wherein, if power is lost, then the at least one emergency lamp is powered from the backup power source of the emergency ballast.

2. The emergency lighting system of claim 1 wherein:
    the back-up power source of the emergency ballast is a battery electrically connected to the emergency ballast; and
    wherein the battery is charged when primary power is supplied to the emergency ballast from the primary power source.

3. The emergency lighting system of claim 1 wherein a relay operates the circuit breaker to provide connection from the primary power source to the emergency lighting control circuit.

4. The emergency lighting system of claim 3 wherein the relay is a remotely-operated-relay.

5. The emergency lighting system of claim 1, further comprising:
    an electrical panel board operatively connects the circuit breaker to the primary power source; and
    wherein the electrical panel board comprises a phase layout comprising a plurality of consecutively arranged phases wherein a pair of consecutive phases are of the same phase.

6. The emergency lighting system of claim 5:
    wherein the circuit breaker is a 2-pole branch circuit breaker electrically connected to the pair of consecutive phases that are of the same phase; and
    wherein the remotely-operated-relay is a 1-pole remotely-operated-relay electrically connected to one pole of the 2-pole branch circuit breaker.

7. The emergency lighting system according to claim 6 wherein the 2-pole branch circuit breaker comprises a BQD circuit breaker.

8. The emergency lighting system according to claim 6 wherein the 2-pole branch circuit breaker comprises a remotely controllable circuit breaker.

9. The emergency lighting system according to claim 8 further comprising an automated control system electrically connected to the electrical panel board for controlling the remotely controllable circuit breaker.

10. The emergency lighting system according to claim 6 further comprising a programmed controller for controlling the 2-pole branch circuit breaker.

11. The emergency lighting system according to claim 6 wherein the emergency lighting control circuit further comprising:
    a normal power input electrically connected to the load side of the 1-pole remotely-operated-relay such that the normal power input is connected to one phase of the plurality of phases;
    an emergency power input electrically connected to the load side of the 2-pole branch circuit breaker such that the emergency power input is electrically connected to the two consecutive phases of the same phase; and
    a neutral power input.

12. The emergency lighting system according to claim 1 wherein the circuit breaker further comprises a load terminal and wherein the emergency lighting system further comprises a remote operated device electrically connected to the load side of the circuit breaker.

13. An emergency lighting system, comprising:
a circuit breaker;
an electrical panel board connecting the circuit breaker to the primary power source
an emergency lighting control circuit electrically connected the circuit breaker, the emergency lighting control circuit comprising:
  an AC ballast for operation of lighting, the AC ballast electrically connected to a control pole of the circuit breaker;
  an emergency ballast electrically connected to a noncontrol pole of the circuit breaker;
  at least one lamp operatively connected to a back-up power source of the emergency ballast;
wherein, if power is lost, the at least one emergency lamp is powered from the backup power source of the emergency ballast; and
wherein the electrical panel board comprises:
  a phase layout comprising a plurality of consecutively arranged phases comprising at least one pair of consecutive phases that are of a first phase,
  a 2-pole branch circuit breaker electrically connected to the pair of consecutive phases that are of the first phase, and
  a 1-pole remotely-operated-relay electrically connected to one pole of the 2-pole branch circuit breaker.

14. The emergency lighting system according to claim 13 wherein the electrical panel board comprises a phase layout comprising a plurality of consecutively arranged phases wherein a pair of consecutive phases is of the same phase.

15. The emergency lighting system according to claim 13 wherein the plurality of consecutively arranged phases further comprises a pair of consecutive phases that are of a second phase that is different than the first phase.

16. The emergency lighting system according to claim 13 wherein the 2-pole branch circuit breaker comprises a remotely controllable circuit breaker.

17. A method of operating an emergency lighting system, the method comprising:
providing power to an emergency lighting control circuit of the emergency lighting system wherein a circuit breaker operatively connected to a primary power supply and the emergency lighting control circuit;
providing power via a control line from the circuit breaker to an AC ballast of the emergency lighting control circuit;
providing power via a noncontrol line from the circuit breaker to an emergency ballast of the emergency lighting control circuit;
determining whether power is present on the noncontrol line from the circuit breaker to emergency lighting control circuit;
providing power to at least one emergency lamp from a back-up power source of the emergency ballast if power is not present on the noncontrol line from the circuit breaker to the emergency lighting control circuit.

18. The method of claim 17 wherein the back-up power source of the emergency ballast is a battery.

19. The method of claim 18 wherein a relay controls the connection of the primary power source to the emergency lighting system.

20. The method of claim 19 wherein the relay is a remotely-operated-relay.

* * * * *